US009120551B1

(12) United States Patent
Ratner (10) Patent No.: US 9,120,551 B1
(45) Date of Patent: Sep. 1, 2015

(54) BALLOON LAUNCH TOWER (71) Applicant: Google Inc., Mountain View, CA (US)

(72) Inventor: Daniel Ratner, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/547,609

(22) Filed: Nov. 19, 2014

(51) Int. Cl.
B64B 1/40 (2006.01)
B64B 1/00 (2006.01)

(52) U.S. Cl.
CPC .. *B64B 1/005* (2013.01); *B64B 1/40* (2013.01)

(58) Field of Classification Search
USPC ............... 116/210; 244/31, 63, 1 R
See application file for complete search history.

(56) References Cited

U.S. PATENT DOCUMENTS

| 3,618,276 | A |   | 11/1971 | Vielle et al. |          |
|-----------|---|---|---------|---------------|----------|
| 3,814,353 | A | * | 6/1974  | Nelson        | 244/98   |
| 4,397,793 | A |   | 8/1983  | Stillman et al. |        |
| 5,548,283 | A | * | 8/1996  | Martin        | 340/870.01 |
| 5,850,987 | A | * | 12/1998 | Aurilio et al. | 244/1 TD |
| 6,568,631 | B1 |  | 5/2003  | Hillsdon      |          |
| 8,857,759 | B2 | * | 10/2014 | Yurchak       | 244/31   |
| 2005/0006523 | A1 | * | 1/2005 | French et al. | 244/31  |
| 2008/0067285 | A1 |   | 3/2008  | Gobbi et al.  |          |

FOREIGN PATENT DOCUMENTS

FR 2697227 A1 4/1994

OTHER PUBLICATIONS

Spring, "Google's balloon-powered Internet takes flight: Behind the scenes with Project Loon", IT World, Planet Google, Jun. 15, 2013, retrieved from <http://www.itworld.com/article/2833102/cloud-computing/google-s-balloon-powered-internet-takes-flight--behind-the-scenes-with-project-loon.html#more>.

* cited by examiner

*Primary Examiner* — Christopher P Ellis
(74) *Attorney, Agent, or Firm* — Lerner, David, Littenberg, Krumholz & Mentlik, LLP (57) ABSTRACT Aspects of the disclosure relate to launching high-altitude balloons. For example, a launching system may include a tower having a tubular portion and a top portion. The tubular portion may include an interior space for launching the balloon and the top portion may be configured to allow the balloon to pass into to a space outside of the tower. The tubular portion may also include a plurality of openings configured to redirect air from outside of the tower and into the interior space in order to cause a cyclone of air from the opening towards the top portion. A covering device may be positioned within the tower in order to control airflow from the outside of the tower through the plurality of openings and to cause the cyclone of air.

12 Claims, 10 Drawing Sheets

BALLOON LAUNCH TOWER

BACKGROUND

Computing devices such as personal computers, laptop computers, tablet computers, cellular phones, and countless types of Internet-capable devices are increasingly prevalent in numerous aspects of modern life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

Some systems may provide network access via a balloon network operating in the stratosphere. These networks may include a large number of high-altitude balloons inflated with lighter than air lift gas and deployed from the ground.

Deploying such balloons under other than ideal weather condition can become very difficult. For example, launching such balloons in a windy environment can be potentially hazardous to bystanders, and in some cases, windy conditions can cause damage to the balloons before they are fully inflated and deployed. Solutions such as using a wind shield to block wind from one direction are less useful when wind changes direction and may have to be constantly adjusted. Tubular towers which protect balloons during inflation may work well until a balloon is actually launched and moves out of the exit at the top of the tower. A strong cross wind can cause the balloon to hit the exit of the tower potentially damaging the balloon. Similarly, launching a balloon from a structure such as a warehouse or hangar may work well until the balloon leaves the protection of the structure and into windy conditions.

BRIEF SUMMARY

Aspects of the disclosure provide a system for launching balloons. The system includes a tower having a tubular portion and a top portion. The tubular portion includes an interior space configured for launching a balloon. The top portion is configured to allow the balloon to pass into to a space outside of the tower. The system also includes a plurality of openings. Each opening of the plurality of openings is configured to redirect air from outside of the tower and into the interior space in order to cause a cyclone of air from the opening towards the top portion. The system also includes a covering device positioned within the tower. The covering device is configured to move between a first position and a second position. The second position allows for reduced airflow from the outside of the tower through the plurality of openings, and the first position allows for airflow from the outside of the tower through the plurality of openings to cause the cyclone of air.

In one example, the top portion includes an outer flange configured to reduce a likelihood of the balloon contacting the top portion when the balloon passes into the space outside of the tower. In another example, each opening of the plurality of openings includes an angled portion located within an outer wall of the tower configured to cause order to cause the cyclone of air. In another example, each opening of the plurality of openings is configured to cause the cyclone of air to direct the balloon through the tower to reduce a likelihood of the balloon contacting an interior surface of the tubular portion. In another example, each opening of the plurality of openings is configured to cause the cyclone of air to direct the balloon through the tower and towards the top portion. In another example, the covering device is configured to be rotated within the tower in order to move between the first position and the second position. In another example, the covering device includes a shape that is complementary to an inner surface of the tower. In another example, the system also includes the balloon. In another example, the covering device is configured to be rotated between the first position and the second position.

In another example, the covering device includes a plurality of holes extending through the covering device configured to allow air from the plurality of openings to flow into the interior space. Each hole of the plurality of holes corresponds to at least one opening of the plurality of openings. In addition, when the covering device is in the second position the plurality of holes are configured to be misaligned with corresponding ones of the plurality of holes. Further, when the covering device is in the first position, the plurality of holes are configured to at least partially align with corresponding ones of the plurality of openings in order to allow for airflow from the outside of the tower through the plurality of openings and to cause the cyclone of air.

DETAILED DESCRIPTION

The technology relates to launching high altitude balloons, and in particular, in windy environments. Because of the size and expense of such balloons it can be difficult to safely launch such balloons in high wind environments. In the past, launches have been aided by using peanuts (specialized clamps for launching high-altitude balloons), wind shields, tubular towers with top openings, or from generally enclosed structures such as a warehouse or hangar. Each of these may have significant draw backs based upon their configurations which can cause balloon launches to be slow, unpredictable, and potentially damaging to the balloons. To address these drawbacks, a specialized launch tower may be used.

As an example, a launch tower may be shaped generally as a tube. The tower may have a top portion that flares out into a bell-like shape. This shape may allow for a balloon that is exiting the tower not to hit the sides of the tower. The tube may include an interior space extending through the tower from the top portion within which allows for the balloon to be placed into the tube and inflated before launch. Thus, the width of the interior space may be at least some minimum distance greater than the maximum width of the balloon, again in order to avoid the balloon hitting the sides of the tube.

The sides of the tower may include a plurality of openings that extend from the outside of the tower to the interior space in the tube. These openings may be shaped in order to redirect air from outside of the tower into the tube in an upward spiral flow. This spiral flow may create an internal cyclone effect pulling the air through the opening and out of the tower at the top portion.

The openings may include various shapes such as slots, circles, ovals, etc. In one example, each opening may include a flange or lip portion on the inside of the opening that redirects the air into an upward direction. This flange may be angular, beveled, or curved in order to direct the air into a particular orientation, such as 45 degrees or more or less relative to the opening. Alternatively or in addition to the flange, the opening itself within an outer wall of the tower may be shaped to redirect the airflow into an upward direction.

In order to allow for placement of the balloon within the tower without the spiral airflow, the plurality of openings may include covers. As an example, these covers may include external louvers that can be opened or closed via a mechanical actuating system to increase or decrease the airflow from outside of the tower, through the openings, and into the interior space of the tube. In this regard, when the louvers are opened whatever wind that passes through the openings may be redirected into the cyclone of air. When the louvers are closed, airflow from outside of the tower and through the openings may be restricted or completely stopped.

In another example, these covers may include an internal cover device that can be changed between positions where the plurality of openings are covered to where the plurality of openings are uncovered via a mechanical actuating system. As an example, the internal cover device may also include a plurality of holes that when aligned with the plurality of openings the plurality of openings are uncovered. The internal cover device may also be configured to be rotated, for example, using bearings or some other mechanical actuating device such that the plurality of holes are eventually no longer aligned with the plurality of openings thereby covering the plurality of openings. To allow the internal cover device to rotate more easily within the tower, the internal cover device may have a shape that is complementary to the interior wall of the tower. In this regard, both the interior wall of the tower and the internal cover device may include a rounded or circular shape.

Again, by changing the position of the internal cover device, this may increase or decrease the airflow from outside of the tower, through the openings, and into the interior space of the tube. In this regard, when the plurality of openings are uncovered whatever wind that passes through the openings may be redirected into the cyclone of air. When the plurality of openings are covered, airflow from outside of the tower and through the openings may be restricted or completely stopped. In some instances, the plurality of openings may also be partially uncovered.

The features described herein allow for a controlling the launch of expensive, high-altitude balloons in environments with relatively high wind speeds. The faster the wind speeds against the tower when the louvers are opened, the faster the internal cyclone effect will be inside the tube. This in turn, may more quickly move the balloon up through the tube and out of the top portion, while at the same time reducing the likelihood of the balloon hitting the inside of the tube.

Figure 1:
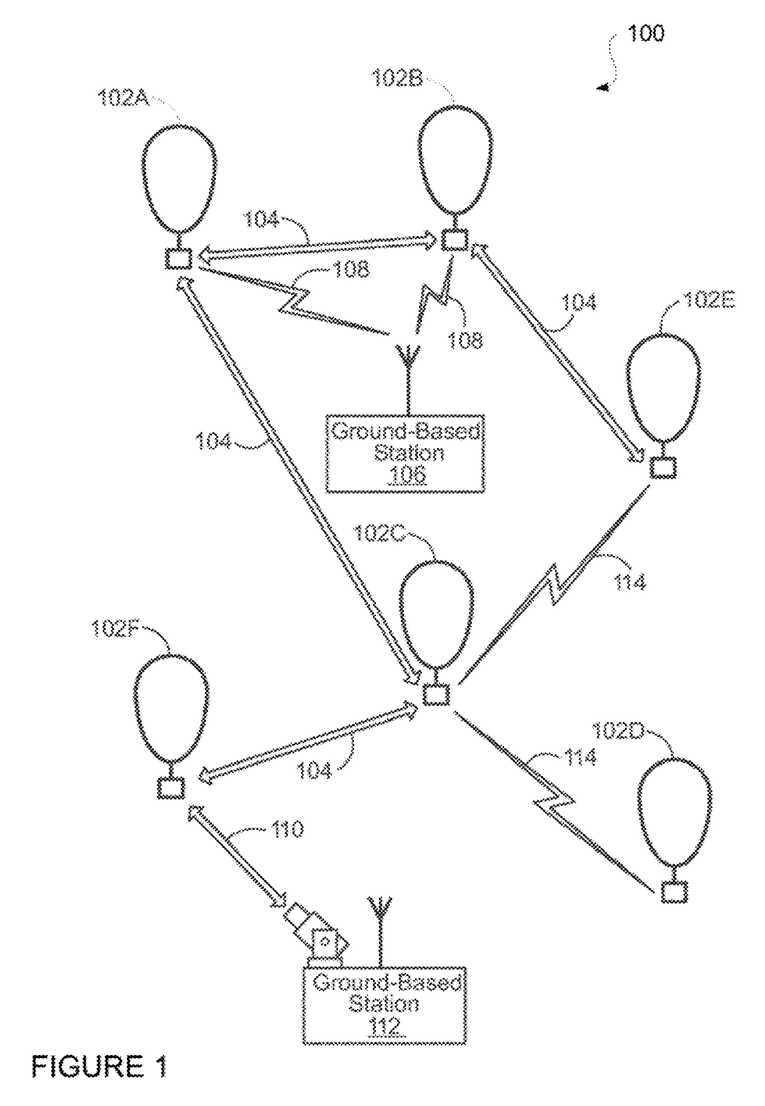
FIG. 1 is a functional diagram of a system in accordance with aspects of the disclosure.

FIG. 1 depicts an example system 100 in which a high altitude balloons as described above may be used. This example should not be considered as limiting the scope of the disclosure or usefulness of the features described herein. System 100 may be considered a "balloon network." In this example, balloon network 100 includes a plurality of devices, such as of high altitude balloons 102A-F as well as ground base stations 106 and 112. Balloon network 100 may also include a plurality of additional devices, such as various computing devices (not shown) as discussed in more detail below.

As shown, the devices of system 100 are configured to communicate with one another. As an example, the balloons may include free-space optical links 104 and/or radiofrequency (RF) links 114 in order to facilitate intra-balloon communications. In this way, balloons 102A-F may collectively function as a mesh network for packet data communications. Further, at least some of balloons 102A-B may be configured for RF communications with ground-based stations 106 and 112 via respective RF links 108. Some balloons, such as balloon 102F, could be configured to communicate via optical link 110 with ground-based station 112.

As noted above, to transmit data to another balloon, a given balloon 102 may be configured to transmit an optical signal via an optical link 104. In addition, the given balloon 102 may use one or more high-power light-emitting diodes (LEDs) to transmit an optical signal. Alternatively, some or all of the balloons may include laser systems for free-space optical communications over the optical links 104. Other types of free-space optical communication are possible. Further, in order to receive an optical signal from another balloon via an optical link 104, a given balloon may include one or more optical receivers.

The balloons 102A-F may collectively function as a mesh network. More specifically, since balloons 102A-F may communicate with one another using free-space optical links, the balloons may collectively function as a free-space optical mesh network where each balloon may function as a node of the mesh network. As noted above, the balloons of balloon network 100 may be high-altitude balloons, which are deployed in the stratosphere. As an example, the balloons may generally be configured to operate at altitudes between 18 km and 25 km above the Earth's surface in order to limit the balloon's exposure to high winds and interference with commercial airline flights. Additional aspects of the balloons are discussed in greater detail below, with reference to FIG. 2.

Figure 2:
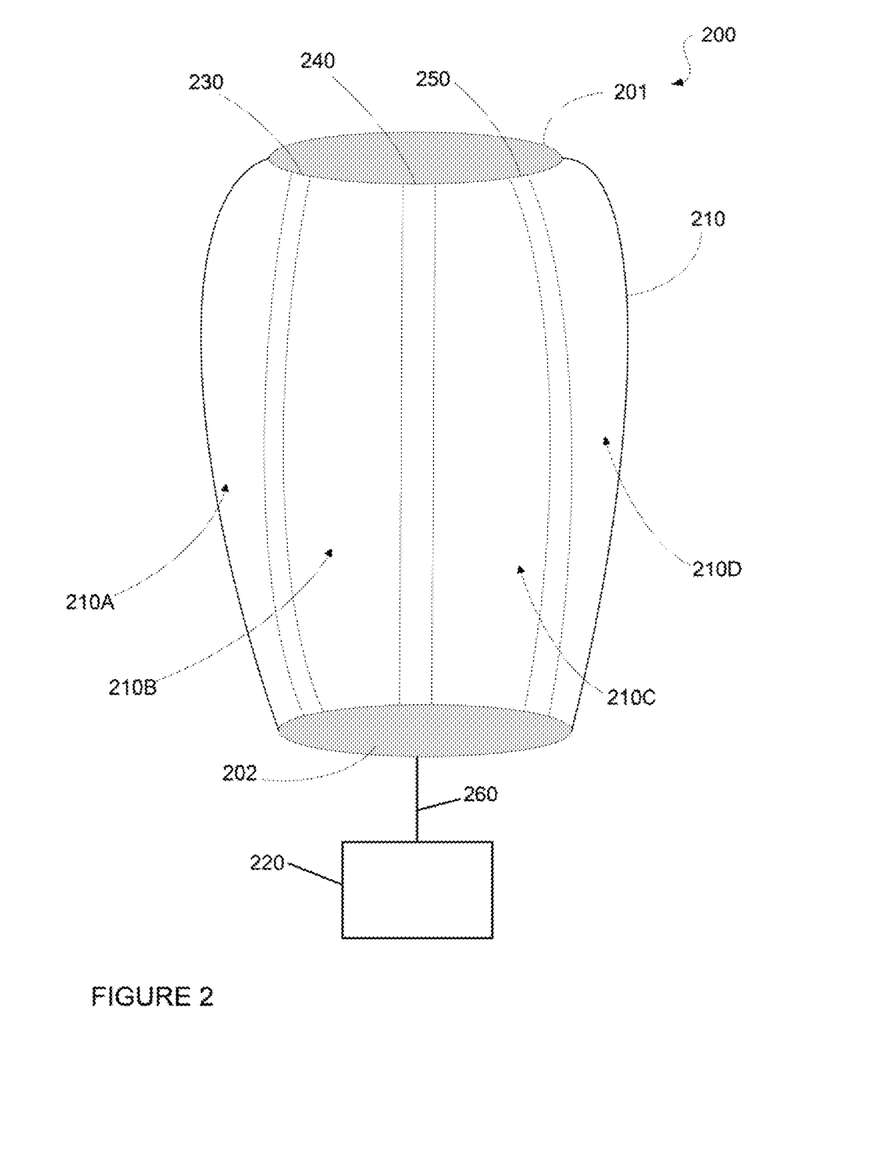
FIG. 2 is an example of a balloon in accordance with aspects of the disclosure.

FIG. 2 is an example high-altitude balloon 200, which may represent any of the balloons of balloon network 100. As shown, the balloon 200 includes an envelope 210, a payload 220 and a plurality of tendons 230-250 attached to the envelope 210.

The high-altitude balloon envelope 210 may take various forms. In one instance, the balloon envelope 210 may be constructed from materials such as polyethylene that do not hold much load while the balloon 200 is floating in the air during flight. Additionally, or alternatively, some or all of envelope 210 may be constructed from a highly flexible latex material or rubber material such as chloroprene. Other materials or combinations thereof may also be employed. Further, the shape and size of the envelope 210 may vary depending upon the particular implementation. Additionally, the envelope 210 may be a chamber filled with various gases or mixtures thereof, such as helium, hydrogen or any other lighter-than-air gas, hereafter, lift gas. The envelope 210 is thus arranged to have an associated upward buoyancy force during deployment of the payload 220.

The payload 220 of balloon 200 is affixed to the envelope by a connection 260 such as a cable. The payload 220 may include a computer system (not shown), having one or more processors and on-board data storage. The payload 220 may also include various other types of equipment and systems (not shown) to provide a number of different functions. For example, the payload 220 may include an optical communication system, a navigation system, a positioning system, a lighting system, an altitude control system and a power supply to supply power to various components of balloon 200.

In view of the goal of making the balloon envelope 210 as lightweight as possible, it may be comprised of a plurality of envelope lobes or gores that have a thin film, such as polyethylene or polyethylene terephthalate, which is lightweight, yet has suitable strength properties for use as a balloon envelope deployable in the stratosphere. In this example, balloon envelope 210 is comprised of envelope gores 210A-210D.

The individual envelope gores 210A-210D may be shaped so that the length of the edge seam connecting adjacent envelope gores is greater than the length of a centerline of the envelope gores. Thus, the envelope gores 210A-210D may be shaped to better optimize the strain rate experienced by the balloon envelope 210. The pressurized lifting gas within the balloon envelope 210 may cause a force or load to be applied to the balloon 200.

The tendons 230-250 provide strength to the balloon 200 to carrier the load created by the pressurized gas within the balloon envelope 210. In some examples, a cage of tendons (not shown) may be created using multiple tendons that are attached vertically and horizontally. Each tendon may be formed as a fiber load tape that is adhered to a respective envelope gore. Alternately, a tubular sleeve may be adhered to the respective envelopes with the tendon positioned within the tubular sleeve.

Top ends of the tendons 230, 240 and 250 may be coupled together using an apparatus, such as top cap 201 positioned at the apex of balloon envelope 210. Bottom ends of the tendons 230, 240 and 250 may also be connected to one another. For example, a corresponding apparatus, e.g., bottom cap 202, is disposed at a base or bottom of the balloon envelope 210. The top cap 201 at the apex may be the same size and shape as and bottom cap 202 at the bottom. Both caps include corresponding components for attaching the tendons 230, 240 and 250, and may be formed from stainless steel or aluminum.

Figure 3:
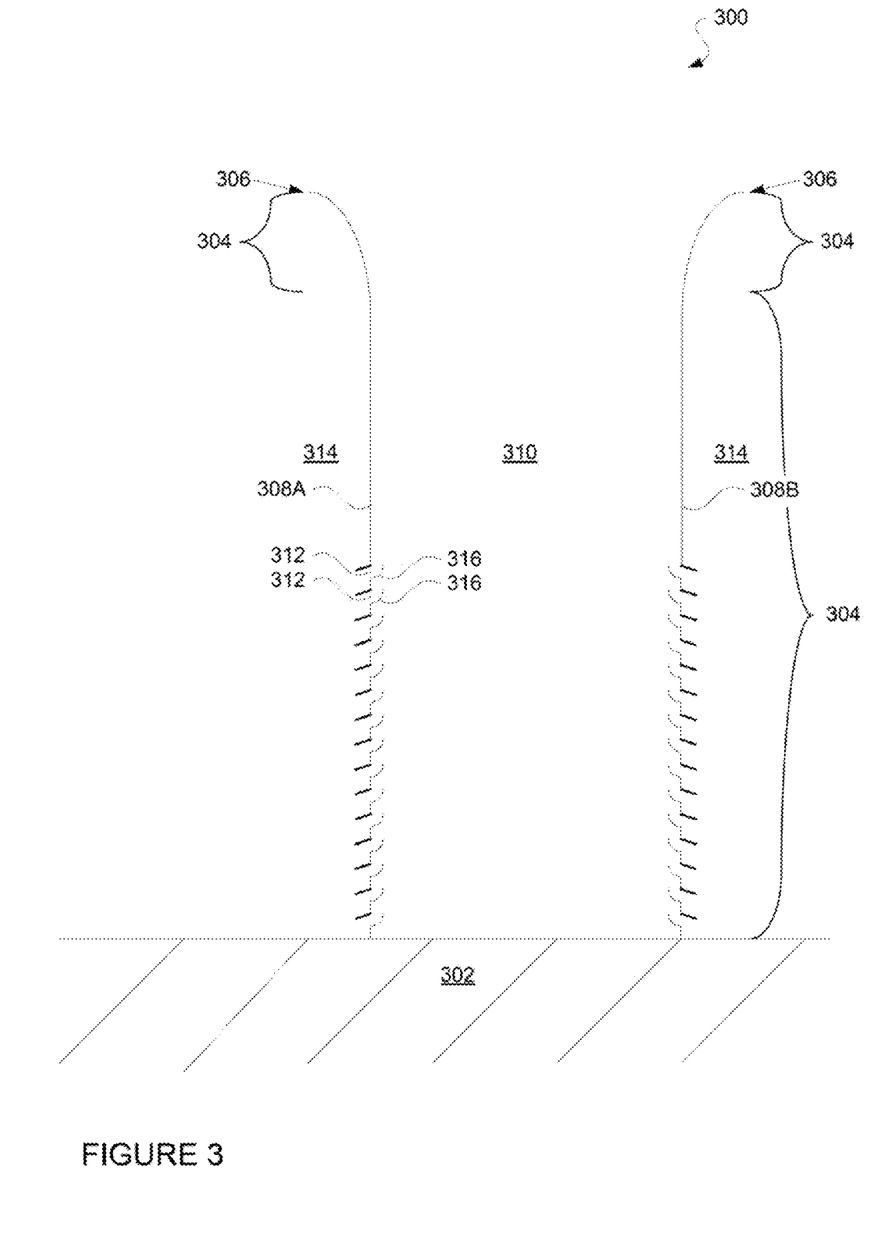
FIG. 3 is an example of a balloon launch tower in accordance with aspects of the disclosure.

The balloons described above may be inflated with lighter than air lift gas and launched from a launch tower. FIG. 3A is an example cross-sectional side view of a launch tower 300 shown over ground 302. The launch tower 300 includes a top portion 304 that flares out into a bell-like shape 306. As noted above, this shape may prevent or reduce the likelihood of a balloon exiting the tower hitting the sides of the tower thereby reducing the likelihood of damage to the balloon where there is a cross wind at the top portion 306 of the tower.

Below top portion 304 is a tube 308. The tube includes interior space 310 extending through the tower 308 from the top portion 304. The interior space 310 may allow for a balloon to be positioned within the tube 308 of the tower 300, inflated with lift gas, and deployed upwards through the top portion 304 of the tower 300. Thus, the width of the interior space 310 may be at least some minimum distance greater than the maximum width of the balloon, again in order to avoid the balloon hitting the sides of the tube.

The walls 308A and 308B of the tube 308 include a plurality of openings 312. Each opening of the plurality of openings 312 extends from an area 314 outside of the tower 300 to the interior space 310 of the tube 308. Thus, each opening of the plurality of openings 312 may allow air to flow from area 314 through that opening and into the interior space 310.

The openings of the plurality of openings 312 may include various shapes such as slots, circles, ovals, etc. In one example, each opening may include a flange 314 or lip portion on the inside of the opening. This flange 314 may be angular, beveled, or curved in order to direct the air into a particular orientation, such as 45 degrees or more or less relative to the opening. Alternatively or in addition to the flange, the opening itself within walls 308A and 308B of the tube 308 may be shaped in order to direct airflow from the area 314 outside of the tower into the interior space 310 in a particular direction.

Figure 4:
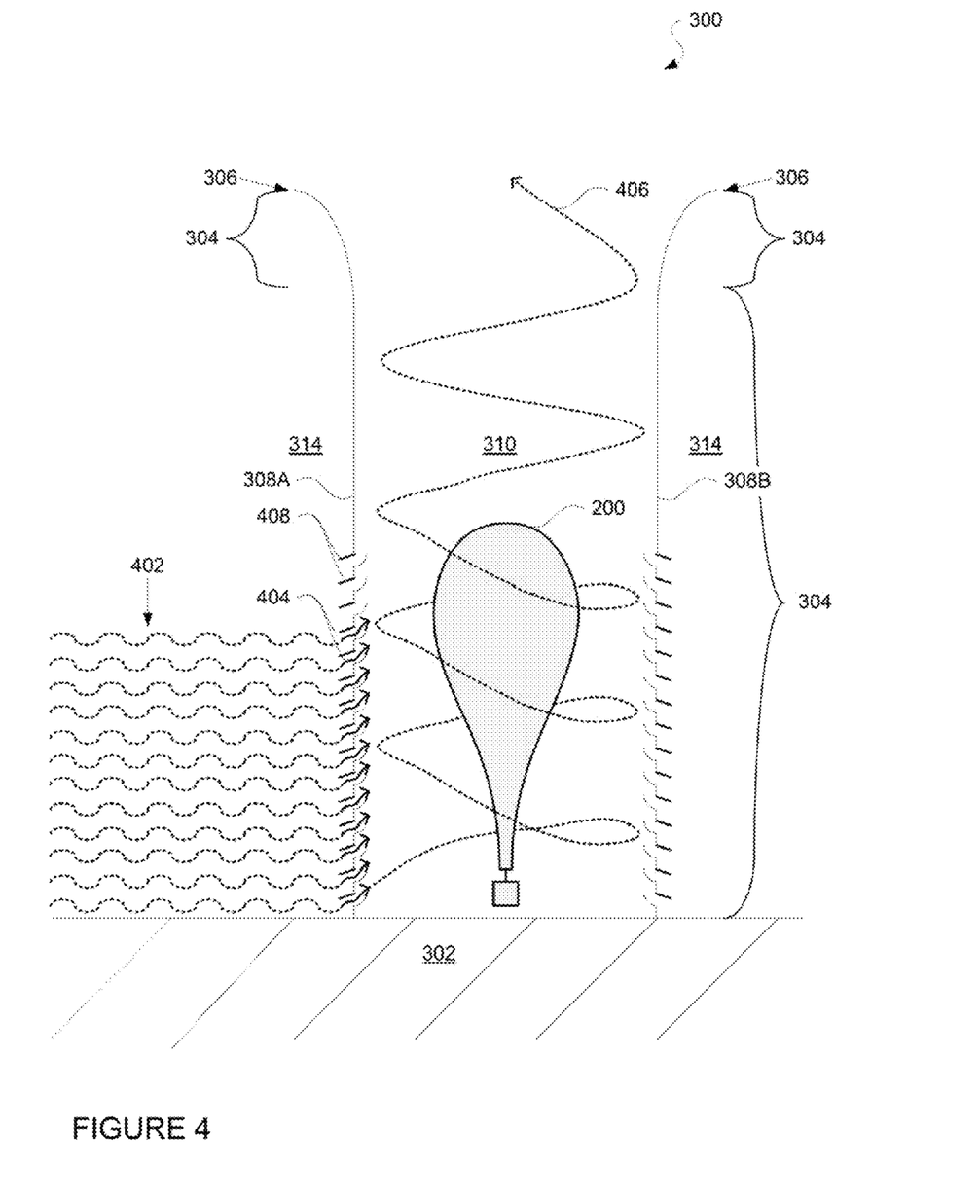
FIG. 4 is an example of the balloon launch tower of FIG. 3 with depictions of wind and a cyclone of air in accordance with aspects of the disclosure.

The shape of the plurality of openings 312 and/or flanges 316 may actually allow the openings and/or flanges redirect air from area 314 and into the interior space 310 in an upward spiral flow. This spiral flow may create an internal cyclone effect pulling air through the plurality of openings 312 and out of the tower 300 at the top portion 304. For example, as shown in FIG. 4, wind or airflow (represented by dashed lines 402) may enter the openings 312 which, in combination with the flanges 316, redirect the airflow 402 in the direction of arrows 404. This may cause an internal cyclone of air (a portion of a cyclone represented by dashed line 406) to move around balloon 200 within the interior space 310. The cyclone of air moves from the tube 308 towards the top portion 304 until it exits the tower 300.

Figure 5:
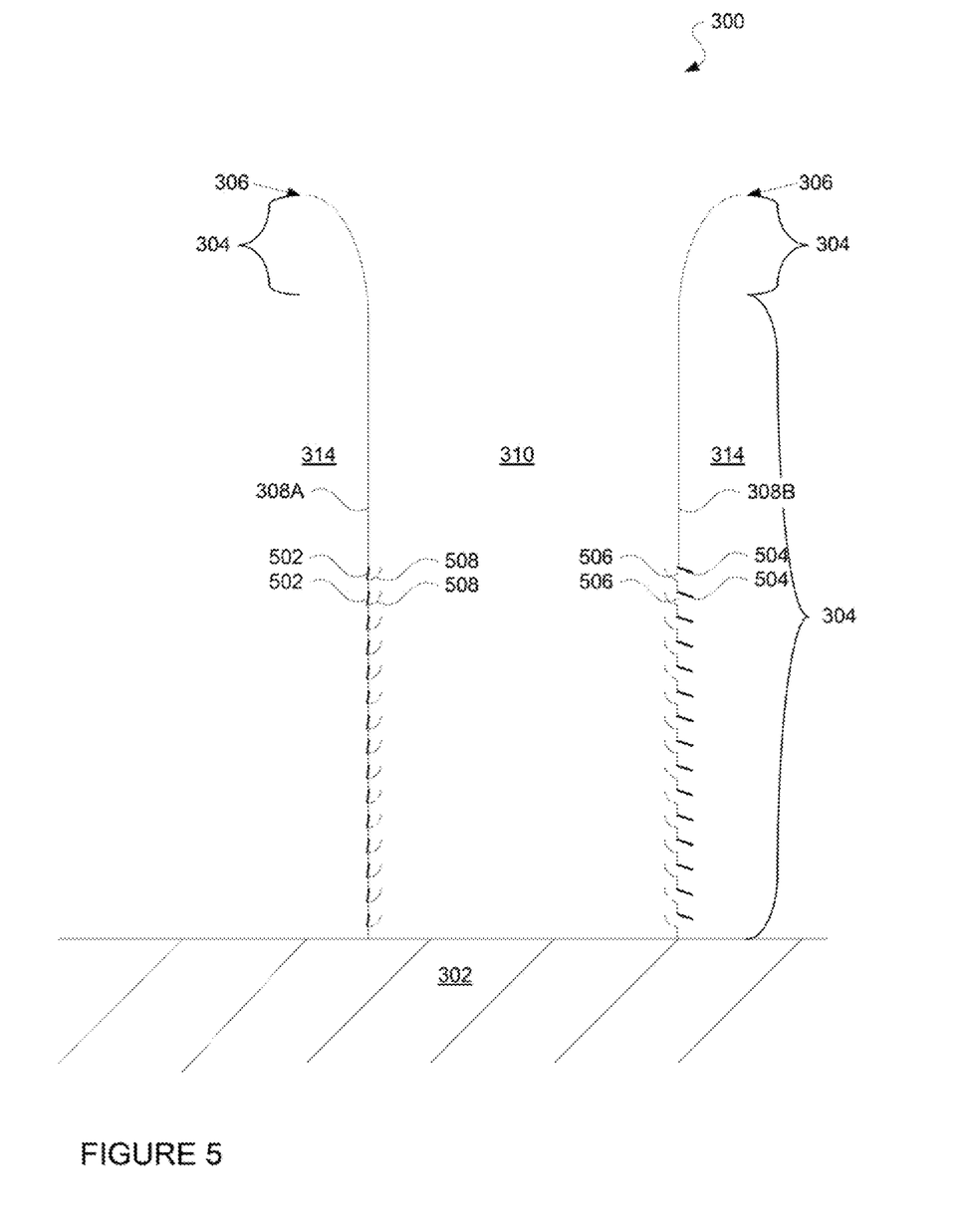
FIG. 5 is another example of the balloon launch tower of FIG. 3 in accordance with aspects of the disclosure.

In order to allow for placement of the balloon 200 within the tower 300 and to control airflow as well as the cyclone of air, the plurality of openings 312 may include covers. As an example, these covers may include external louvers 408 that can be opened or closed via a mechanical actuating system (not shown) to increase or decrease the airflow from the area 314 outside of the tower, through the plurality of openings 312, and into the interior space 310. FIG. 5 is an example depicting a first set of louvers 502 (corresponding to a portion of louvers 408) in an open configuration and a second set of louvers 504 (also corresponding to a portion of louvers 408) in a closed configuration. In this example, louvers are shown in different configurations at the same time, but in other examples, the louvers may all be in the open or may all be in the closed configuration at the same time. When the louvers are in an open configuration, as shown by louvers 504, whatever airflow from area 314 that passes through the plurality of openings 506 (corresponding to a portion of the plurality of openings 312) may be redirected into the cyclone of air. When the louvers are in a closed configuration, as shown by louvers 502, airflow from the area 314 and through the plurality of openings 508 (corresponding to a portion of the plurality of openings 312) may be restricted or completely stopped.

Figure 6:
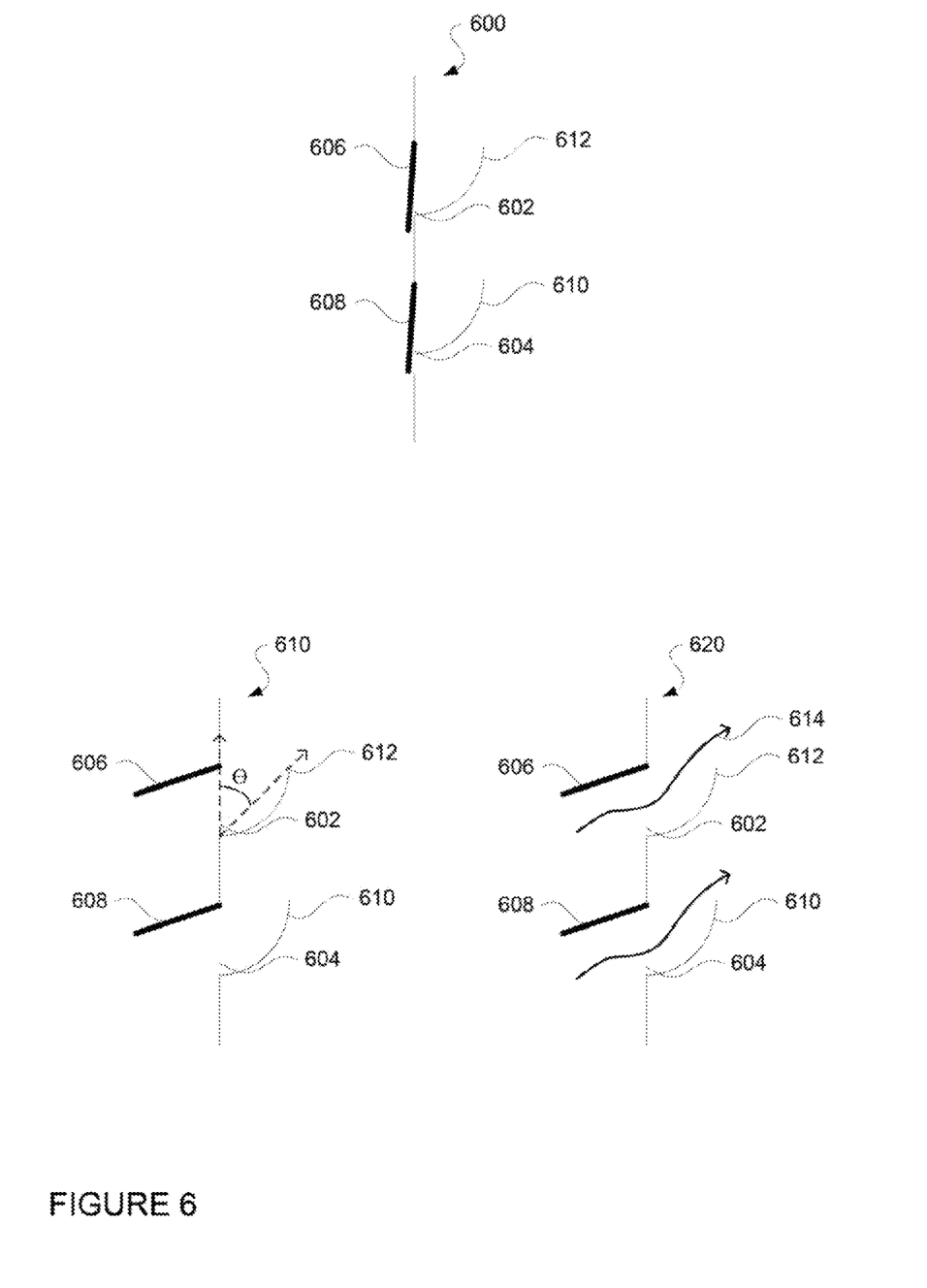
FIG. 6 is a detail view of features of the balloon launch tower of FIG. 3 in accordance with aspects of the disclosure.

By way of further example, FIG. 6 includes three detail views 600, 620, and 640 of two of the plurality of openings 312, here openings 602 and 604, with corresponding louvers 606 and 608 (corresponding to two of louvers 408) and flanges 610 and 612 (corresponding to two of flanges 316). In view 600, louvers 606 and 608 are depicted in the closed configuration allowing airflow from area 314 to be redirected into the cyclone, while in views 620 and 640, louvers 606 and 608 are depicted in the open configuration restricting or completely stopping airflow through the openings 602 and 604. View 620 also demonstrates the angle θ of flange 612 which redirects airflow in the direction of arrow 614 (corresponding to one of arrows 404).

Figure 7:
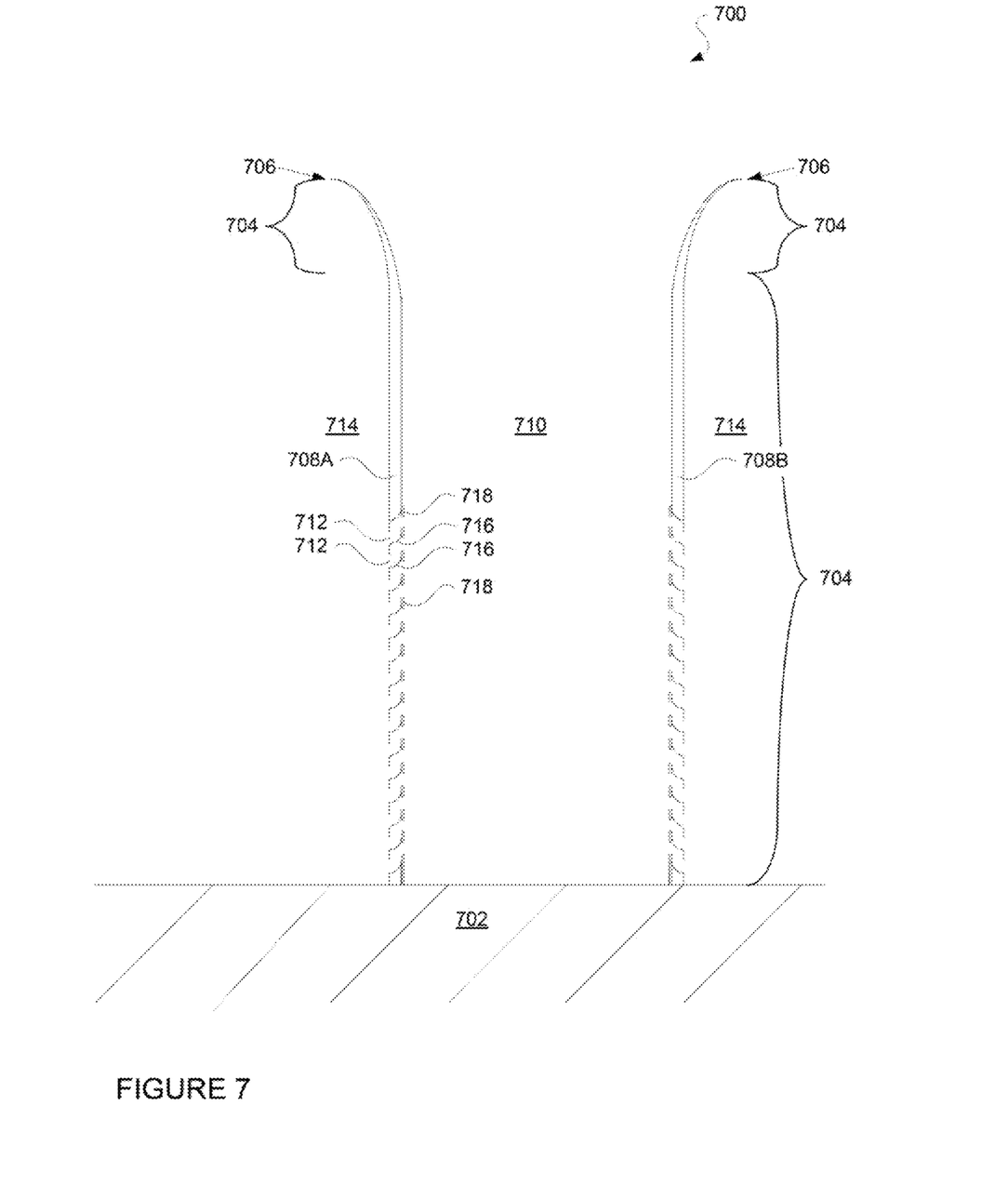
FIG. 7 is another example of a balloon launch tower in accordance with aspects of the disclosure.

FIG. 7 is another example cross-sectional side view of a launch tower 700 shown over ground 702. Tower 700 may include many of the features of tower 300. For example, tower 700 includes a top portion 704 that flares out into a bell-like shape 706. As noted above, this shape may prevent or reduce the likelihood of a balloon exiting the tower hitting the sides of the tower thereby reducing the likelihood of damage to the balloon where there is a cross wind at the top portion 706 of the tower.

Below top portion 704 is a tube 708. The tube includes interior space 710 extending through the tower 708 from the top portion 704. The interior space 710 may allow for a balloon to be positioned within the tube 708 of the tower 700, inflated with lift gas, and deployed upwards through the top portion 704 of the tower 700. Thus, the width of the interior space 710 may be at least some minimum distance greater than the maximum width of the balloon, again in order to avoid the balloon hitting the sides of the tube.

The walls 708A and 708B of the tube 708 include a plurality of openings 712. Each opening of the plurality of openings 712 extends from an area 714 outside of the tower 700 to the interior space 710 of the tube 708. Thus, each opening of the plurality of openings 712 may allow air to flow from area 714 through that opening and into the interior space 710.

The openings of the plurality of openings 312 may include various shapes such as slots, circles, ovals, etc. In one example, each opening may extend through a respective portion 316 of walls 708A or 708B with an angular, beveled, or curved shape in order to direct the air into a particular orientation, such as 45 degrees or more or less relative to the opening.

Figure 8:
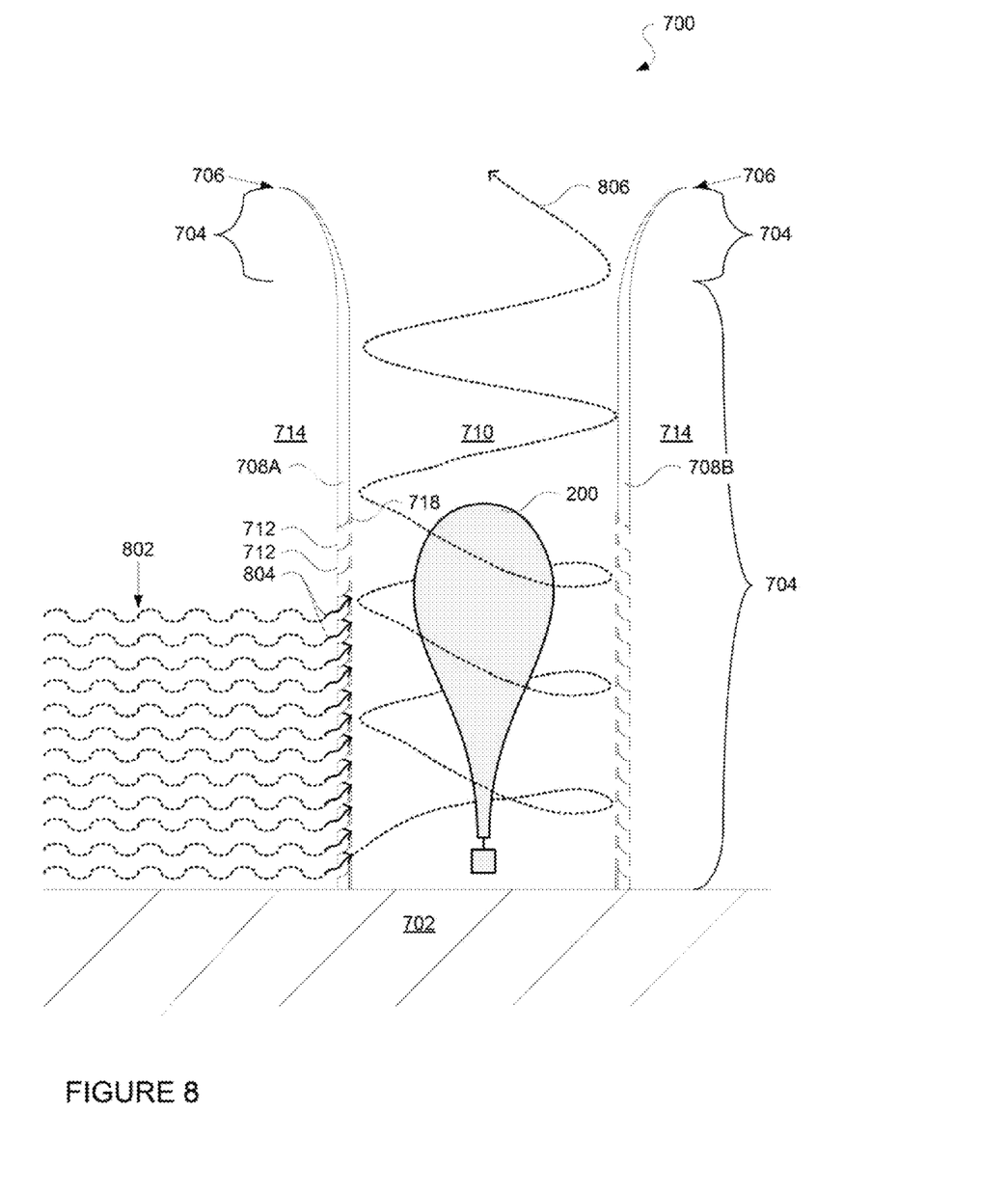
FIG. 8 is an example of the balloon launch tower of FIG. 7 with a depiction of wind and a cyclone of air in accordance with aspects of the disclosure.

The shape of the portions 716 of the plurality of openings 712 may actually allow the openings to redirect air from area 718 and into the interior space 710 in an upward spiral flow. This spiral flow may create an internal cyclone effect pulling air through the plurality of openings 712 and out of the tower 700 at the top portion 708. For example, as shown in FIG. 8, wind or airflow (represented by dashed lines 802) may enter the openings 712 which, in combination with the flanges 716, redirect the airflow 802 in the direction of arrows 808. This may cause an internal cyclone of air (a portion of a cyclone represented by dashed line 806) to move around balloon 200 within the interior space 710. The cyclone of air moves from the tube 708 towards the top portion 708 until it exits the tower 700.

Figure 9:
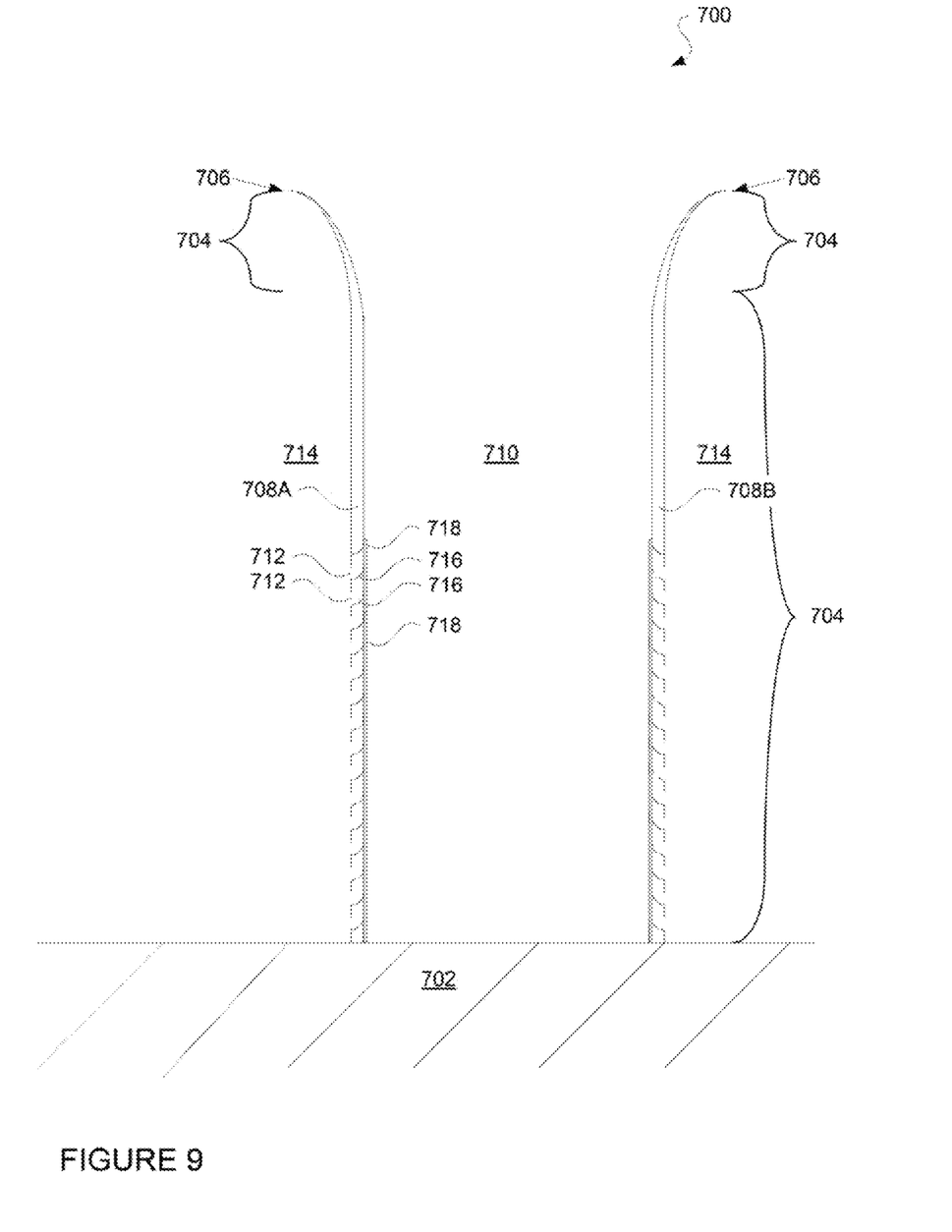
FIG. 9 is another example of the balloon launch tower of FIG. 7 in accordance with aspects of the disclosure.

In order to allow for placement of the balloon 200 within the tower 700 and to control airflow as well as the cyclone of air, as with tower 300 and plurality of openings 312, the plurality of openings 712 may include an internal cover device. For example, returning to FIG. 7, tower 300 includes an internal cover device 718. The internal cover device 318 can be changed between configurations where the plurality of openings 712 are covered as shown in FIGS. 7 and 8, to configurations where the plurality of openings 712 are uncovered, as shown in FIG. 9, via a mechanical actuating system (not shown).

As an example, the internal cover device 718 may also include a plurality of holes 720 that when aligned with the plurality of openings 712 as shown in FIGS. 7 and 8, allow airflow from area 714 through the plurality of openings 712 and the plurality of holes 720. The internal cover device 718 may also be configured to be rotated, for example, using bearings or some other mechanical actuating device such that the plurality of holes are eventually no longer aligned with the plurality of openings thereby covering the plurality of openings as shown in FIG. 9.

To allow the internal cover device 718 to rotate more easily within the tower, the internal cover device 718 may have a shape that is complementary to an interior wall of the tower. In this regard, both the interior wall of the tower 700 (for example an interior surface of walls 708A and/or 708B) and the internal cover device 718 may include a rounded or circular shape.

Figure 10:
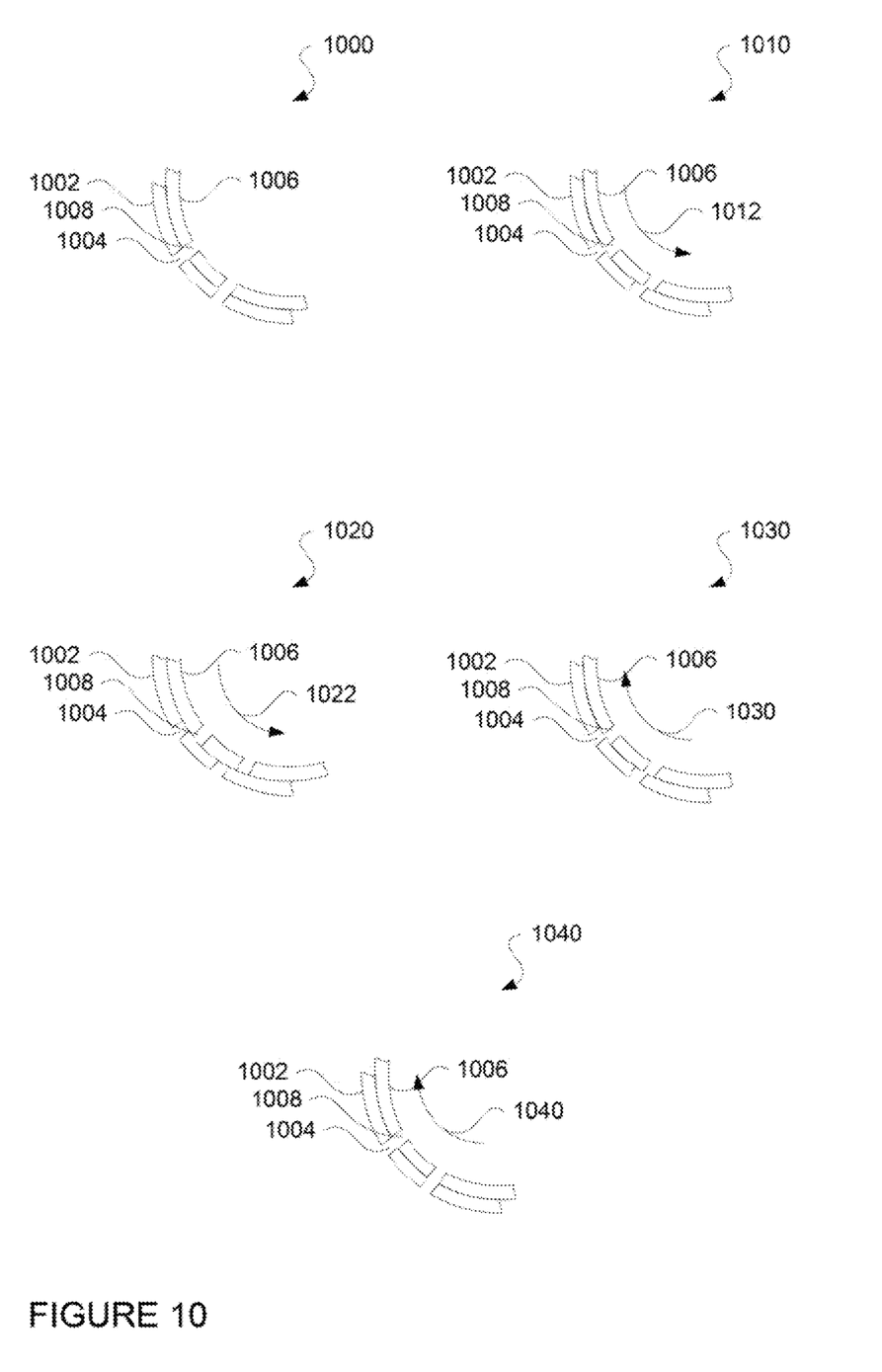
FIG. 10 is a detail view of features of the balloon launch tower of FIG. 7 in accordance with aspects of the disclosure.

FIG. 10 is an example of 5 top-down cross-sectional views 1000, 1010, 1020, 1030, and 1040 of a portion of wall 708A or 708B of tower 700. In each of the views, an interior surface of a portion 1002 of wall 708A (or 708B) is generally curved and complementary to the shape of a portion 1006 of internal cover device 718. In addition, portion 1002 of wall 708A (or 708B) includes opening 1004 (corresponding to one of the plurality of holes 712), and portion 1006 of internal cover device 718 includes hole 1008 (corresponding to one of the plurality of holes 720).

Again, by changing the position of the internal cover device 718, this may increase or decrease the airflow from area 714, through the plurality of openings 712, and into the interior space 710. In view 1000, the hole 1008 is shown as aligned with opening 1004. In this configuration, which may be considered a fully open configuration, whatever airflow from area 714 that passes through the opening 1004 may be redirected into the cyclone of air. The internal cover device 718 may then be rotated, for example in the direction of arrow 1012 in view 1010. In view 1010, the hole 1008 is shown as slightly misaligned with opening 1004. In this configuration, which may be considered a partially open configuration, airflow from area 714 that passes through the opening 1004 may be reduced from that of view 1000. The cover device 720 may then be further rotated, for example in the direction of arrow 1022 in view 1020. In view 1020, the hole 1008 is shown as completely misaligned with opening 1004. In this configuration, which may be considered a closed configuration, airflow from area 714 that passes through the opening 1004 may be restricted or completely stopped from entering the interior space 710.

The internal cover device 718 may also be rotated from the closed configuration back towards the open configuration. For example, the internal cover device 718 may be rotated in the direction of arrow 1032 in view 1030. In view 1030, and similar to view 1010, the hole 1008 is shown as slightly misaligned with opening 1004. Once again, the internal cover device 718 is in the partially open configuration where airflow from area 714 that passes through the opening 1004 may be reduced from that of view 1000 but increased from that of view 1040. The cover device 720 may then be further rotated, for example in the direction of arrow 1042 in view 1040. In view 1040, the hole 1008 is shown as aligned with opening 1004. Once again, the internal cover device 718 is in the open configuration where airflow from area 714 that passes through the opening 1004 may be redirected into the cyclone of air.

Alternatively, rather than rotating in two different directions relative to the portion 1002 of wall 708A (or 708B) in order to change between the open and the closed configurations, the internal cover device 718 may be rotated in one or two directions over a larger angle. For example, the internal cover device 718 may be configured to rotate for 360 degrees or less in order to align or misalign the openings and holes. In this regard, a single hole may be configured to be aligned with a plurality of different openings as the internal cover device 718 is rotated.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of

The invention claimed is:

1. A system for launching balloons, the system comprising:
   a tower having a tubular portion and a top portion, the tubular portion including an interior space configured for launching a balloon and the top portion being configured to allow the balloon to pass into to a space outside of the tower;
   a plurality of openings, each opening of the plurality of openings being configured to redirect air from outside of the tower and into the interior space in order to cause a cyclone of air from the opening towards the top portion; and
   a covering device positioned within the tower, the covering device being configured to move between a first position and a second position, wherein the second position allows for reduced airflow from the outside of the tower through the plurality of openings and the first position allows for airflow from the outside of the tower through the plurality of openings to cause the cyclone of air.

2. The system of claim 1, wherein the top portion includes an outer flange configured to reduce a likelihood of the balloon contacting the top portion when the balloon passes into the space outside of the tower.

3. The system of claim 1, wherein each opening of the plurality of openings includes an angled portion located within an outer wall of the tower configured to cause order to cause the cyclone of air.

4. The system of claim 1, wherein each opening of the plurality of openings is configured to cause the cyclone of air to direct the balloon through the tower to reduce a likelihood of the balloon contacting an interior surface of the tubular portion.

5. The system of claim 1, wherein each opening of the plurality of openings is configured to cause the cyclone of air to direct the balloon through the tower and towards the top portion.

6. The system of claim 1, wherein the covering device is configured to be rotated within the tower in order to move between the first position and the second position.

7. The system of claim 1, wherein the covering device includes a shape that is complementary to an inner surface of the tower.

8. The system of claim 1, further comprising the balloon.

9. The system of claim 1, wherein the covering device is configured to be rotated between the first position and the second position.

10. The system of claim 1, wherein the covering device includes a plurality of holes extending through the covering device configured to allow air from the plurality of openings to flow into the interior space, each hole of the plurality of holes corresponding to at least one opening of the plurality of openings.

11. The system of claim 10, wherein when the covering device is in the second position, the plurality of holes are configured to be misaligned with corresponding ones of the plurality of holes.

12. The system of claim 11, wherein when the covering device is in the first position, the plurality of holes are configured to at least partially align with corresponding ones of the plurality of openings in order to allow for airflow from the outside of the tower through the plurality of openings and to cause the cyclone of air.

* * * * *